United States Patent
Gwak et al.

(10) Patent No.: US 8,170,409 B2
(45) Date of Patent: May 1, 2012

(54) METHOD AND APPARATUS FOR CONTROLLING FLASH EMISSION

(75) Inventors: Jin-pyo Gwak, Suwon-si (KR); Sung-ha Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/721,683

(22) Filed: Mar. 11, 2010

(65) Prior Publication Data

US 2010/0232778 A1    Sep. 16, 2010

(30) Foreign Application Priority Data

Mar. 16, 2009    (KR) .................. 10-2009-0022187

(51) Int. Cl.
*G03B 15/03* (2006.01)
(52) U.S. Cl. ............ 396/157; 396/180; 348/221.1; 348/371

(58) Field of Classification Search .............. 396/157, 396/180, 181; 348/221.1, 371
See application file for complete search history.

(56) References Cited

U.S. PATENT DOCUMENTS

| | | | |
|---|---|---|---|
| 7,675,569 B2* | 3/2010 | Maeda ............... | 348/371 |
| 7,680,410 B2* | 3/2010 | Nose et al. ........... | 396/157 |
| 7,783,189 B2* | 8/2010 | Kubota ............... | 396/213 |
| 2005/0244151 A1* | 11/2005 | Fukui ................. | 396/48 |
| 2007/0263106 A1* | 11/2007 | Tanaka et al. ........ | 348/297 |

* cited by examiner

*Primary Examiner* — Christopher Mahoney
*Assistant Examiner* — Linda B Smith
(74) *Attorney, Agent, or Firm* — Drinker Biddle & Reath LLP (57) ABSTRACT

In a method and apparatus for controlling flash emission, the brightness during pre-emission may be accurately measured even when operating an image sensor using a rolling shutter. When pre-emission of flash light is performed, partial exposure during the pre-emission when operating an image sensor using a rolling shutter may be prevented by synchronizing an exposure time of the image sensor to a pre-emission time.

20 Claims, 7 Drawing Sheets

METHOD AND APPARATUS FOR CONTROLLING FLASH EMISSION

CROSS-REFERENCE TO RELATED PATENT APPLICATION

This application claims the priority benefit of Korean Patent Application No. 10-2009-0022187, filed on Mar. 16, 2009, in the Korean Intellectual Property Office, the disclosure of which is incorporated herein in its entirety by reference.

BACKGROUND

1. Field of the Invention

The present invention relates to a method and apparatus for controlling flash emission, and more particularly, to a method and apparatus for controlling flash emission in conjunction with an image sensor using a rolling shutter, such as a complementary metal-oxide semiconductor (CMOS) sensor.

2. Description of the Related Art

Currently, digital cameras mostly include a flash lamp using a xenon (Xe) tube. A flash lamp is used to correct for the intensity of light illuminating a subject when an image sensor is exposed in a dark environment. In general, flash emissions are corrected by controlling an emission time of flash light. In more detail, a subject may be photographed too brightly if the emission time is too long and too dimly if the emission time is too short. Since the brightness of a subject is controlled based on an emission time of flash light, an algorithm for controlling the emission time is required and two flash emission time control algorithms mainly used are as described below.

First, in an illumination algorithm using an illumination sensor, when an image is captured, flash light is emitted and the brightness of a subject is measured by using the illumination sensor. If the brightness of the subject reaches a preset brightness level due to the flash emission, the flash emission is stopped. The subject is photographed for the emission time of flash light.

Second, in a pre-emission algorithm, flash light is previously emitted at a weak level so as to measure the brightness of a subject, an emission time of flash light for making the subject reach a preset brightness level is calculated, and the subject is photographed by emitting flash light for the calculated emission time.

Meanwhile, a complementary metal-oxide semiconductor (CMOS) image sensor using a rolling shutter may be operated in a live-view mode. Here, the rolling shutter sequentially exposes pixels in one frame. In more detail, the pixels are exposed at different times. When the CMOS image sensor using a rolling shutter is operated, if a subject or a user moves while photographing a subject, image distortion may occur due to different exposure times, which is referred to as a rolling shutter effect.

If the above-described algorithms are applied to a CMOS image sensor, problems may occur as described below. Although the illumination algorithm may be performed in the same manner as a conventional algorithm, if an illumination sensor is used, a cost for the illumination sensor is added, partial image saturation may not be easily corrected, and the illumination sensor has to be additionally adjusted in a manufacturing process of a photographing apparatus.

Although the pre-emission algorithm is generally used, partial image exposure is caused in a CMOS image sensor during pre-emission due to a rolling shutter. In more detail, if the brightness of an image is partially measured during the pre-emission, the brightness may not be normally calculated during the pre-emission, which is a common problem of operating image sensors using a rolling shutter.

SUMMARY

Embodiments of the present invention include a method and apparatus for controlling flash emission capable of accurately measuring the brightness during pre-emission even when operating an image sensor using a rolling shutter. When pre-emission of flash light is performed, partial exposure during the pre-emission when operating an image sensor using a rolling shutter may be prevented by synchronizing an exposure time of the image sensor to a pre-emission time.

According to an aspect of the present invention, a flash emission control method includes performing pre-emission of flash light, synchronizing an exposure time of an image sensor to a pre-emission time, performing photometry according to exposure of the image sensor, calculating a main emission time of the flash light based on a result of the photometry, and controlling main emission of the flash light to be performed for the calculated main emission time.

The image sensor may be a complementary metal-oxide semiconductor (CMOS) image sensor.

The exposure time of the CMOS image sensor may be less than the pre-emission time.

The method may further include executing a live-view mode, and operating the CMOS image sensor using a rolling shutter.

The flash light may be xenon (Xe) flash light.

The calculating of the main emission time may include correcting a brightness deviation of a photometric image by using an inverse function of an emission curve of the flash light.

The calculating of the main emission time may include calculating the main emission time of the flash light based on the corrected brightness of the photometric image.

The calculating of the main emission time may include correcting the brightness deviation corresponding to the inverse function of the emission curve of the flash light by applying the brightness deviation in a vertical direction of the photometric image.

According to another aspect of the present invention, a flash emission control apparatus includes an image sensor controller that synchronizes an exposure time of an image sensor to a pre-emission time when pre-emission of flash light is performed, a main controller that controls photometry to be performed according to exposure of the image sensor, a flash emission time calculator that calculates a main emission time of the flash light based on a result of the photometry, and a flash controller that controls main emission of the flash light to be performed for the calculated main emission time.

The image sensor may be a complementary metal-oxide semiconductor (CMOS) image sensor.

The exposure time of the CMOS image sensor may be less than the pre-emission time.

The image sensor controller may control the CMOS image sensor to operate using a rolling shutter.

The flash light may be xenon (Xe) flash light.

The apparatus may further include a brightness deviation corrector that corrects a brightness deviation of a photometric image by using an inverse function of an emission curve of the flash light.

The flash emission time calculator may calculate the main emission time of the flash light based on the corrected brightness of the photometric image.

The brightness deviation corrector may correct the brightness deviation corresponding to the inverse function of the emission curve of the flash light by applying the brightness deviation in a vertical direction of the photometric image.

According to another aspect of the present invention, a computer-readable storage medium has stored thereon a program executable by a processor for performing the above method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, the present invention will be described in detail by explaining embodiments of the invention with reference to the attached drawings. In the following description of the present invention, only essential parts for understanding operation of the present invention will be described and other parts may be omitted in order not to make the subject matter of the present invention unclear.

Also, the terms used in the specification and the claims should not be limited to conventional or lexical meanings and should be construed as having meanings and concepts corresponding to the technical idea of the present invention in order to most appropriately describe the present invention.

Figure 1:
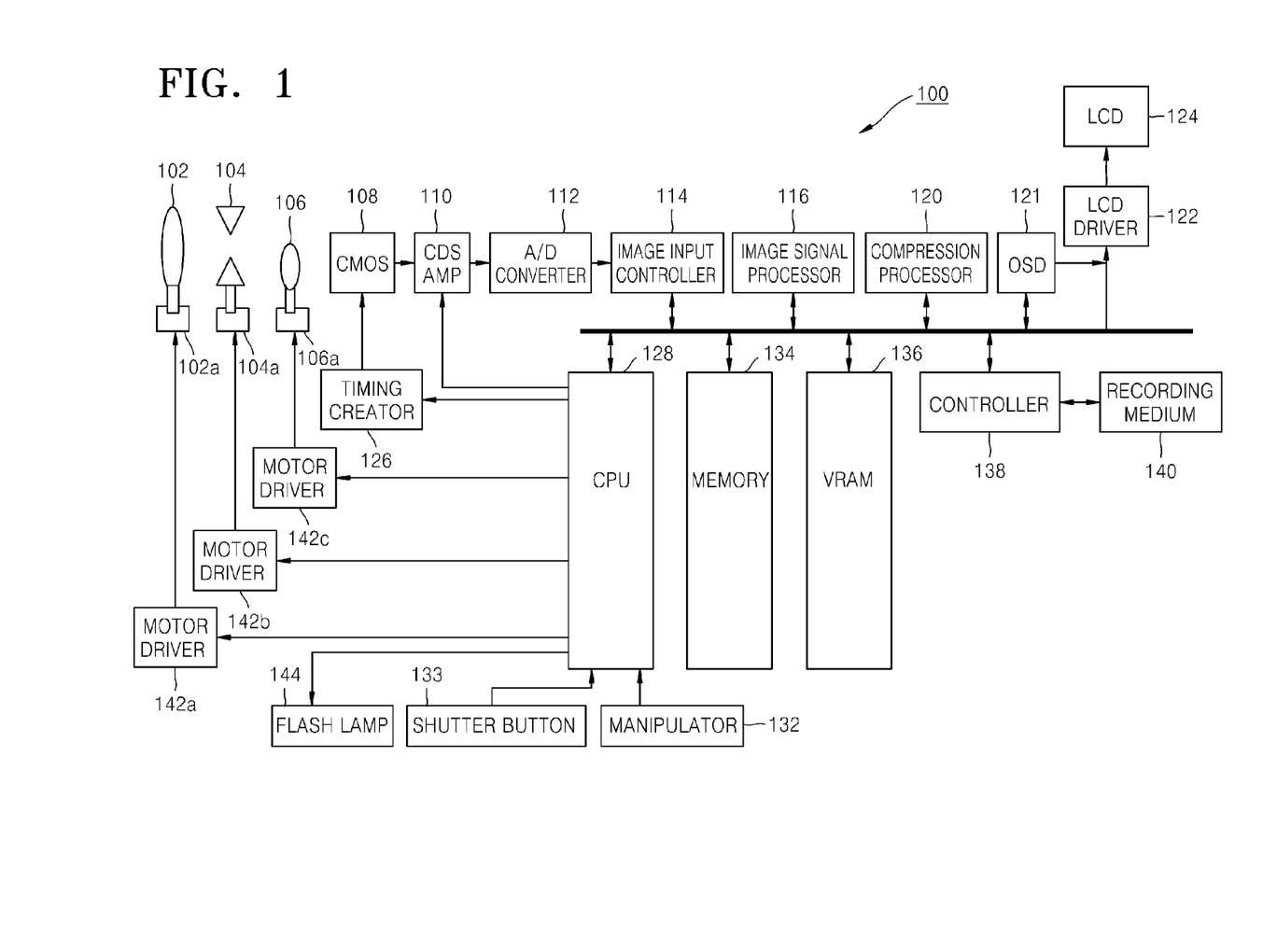
FIG. 1 is a schematic block diagram of a digital photographing apparatus according to an embodiment of the present invention.

FIG. 1 is a schematic block diagram of a digital photographing apparatus 100 according to an embodiment of the present invention.

Referring to FIG. 1, the digital photographing apparatus 100 includes a zoom lens 102, an iris 104, a focus lens 106, drivers 102a, 104a, and 106a, a complementary metal-oxide semiconductor (CMOS) image sensor 108, an amplifier-integrated correlated double sampling (CDS) circuit 110, an analog-to-digital (A/D) converter 112, an image input controller 114, an image signal processor 116, a compression processor 120, an on screen display (OSD) device 121, a liquid crystal display (LCD) driver 122, an LCD device 124, a timing creator 126, a central processing unit (CPU) 128, a manipulator 132, a shutter button 133, a memory 134, a video random access memory (VRAM) 136, a media controller 138, a recording medium 140, motor drivers 142a, 142b, and 142c, and a flash lamp 144.

The zoom lens 102 is moved forward and backward by the driver 102a in an optical axis direction so as to continuously vary a focal length, and thus varies the size of a subject on a screen. The iris 104 is driven by the driver 104a to control the intensity of light to be incident on the CMOS image sensor 108 when an image is captured. The focus lens 106 is moved forward and backward by the driver 106a in the optical axis direction so as to focus on the subject.

Although only one zoom lens 102 and one focus lens 106 are illustrated in FIG. 1, two or more zoom lenses 102 and two or more focus lenses 106 may be included.

The CMOS image sensor 108 converts light incident through the zoom lens 102, the iris 104, and the focus lens 106 into an electrical signal. Although an electronic shutter is used to control a time for extracting the electrical signal in the current embodiment, a mechanical shutter may also be used. In the current embodiment, the zoom lens 102, the iris 104, the focus lens 106, and the CDS circuit 110 form an imaging device. However, elements for forming the imaging device are not limited thereto and the zoom lens 102 or the iris 104 may not be included in the imaging device.

The current embodiment uses the CMOS image sensor 108. The CDS circuit 110 is a circuit in which a CDS circuit that is a type of sampling circuit that removes noise from the electrical signal output from the CMOS image sensor 108 is integrated with an amplifier for amplifying the electrical signal after removing the noise. Although the digital photographing apparatus 100 includes a circuit in which a CDS circuit is integrated with an amplifier in the current embodiment, the CDS circuit and the amplifier may be formed as separate circuits.

The A/D converter 112 converts the electrical signal created by the CMOS image sensor 108 into a digital signal, and creates RAW image data.

The image input controller 114 controls the RAW image data created by the A/D converter 112 to be stored in the memory 134.

The image signal processor 116 corrects a light intensity gain or a white balance with respect to the electrical signal output from the CMOS image sensor 108. The image signal processor 116 obtains exposure data of a captured image. The exposure data includes an autofocus (AF) evaluation value or an auto exposure (AE) evaluation value, and the image signal processor 116 calculates the AF evaluation value or the AE evaluation value.

The compression processor 120 compresses the image processed by the image signal processor 116 into image data in an appropriate compression format. The compression format may be a reversible format or an irreversible format. Examples of the appropriate compression format may include a joint photographic experts group (JPEG) format and a JPEG 2000 format.

The OSD device 121 displays a setting window of the digital photographing apparatus 100 on the LCD device 124. The LCD device 124 displays a live view image before photographing the subject, displays various setting windows of the digital photographing apparatus 100, or displays the captured image. The LCD device 124 is driven by the LCD driver 122 to display images or various types of information of the digital image processing apparatus 100.

The timing creator 126 creates a timing signal and inputs the created timing signal to the CMOS image sensor 108. A shutter speed is determined by the timing signal created by the timing creator 126. In more detail, the CMOS image sensor 108 is driven based on the timing signal created by the timing creator 126 and image light reflected from the subject is incident within a time for driving the CMOS image sensor 108 so as to create the electrical signal that is the basis of the image data.

The CPU 128 executes an instruction of a signal system with respect to the CMOS image sensor 108 or the CDS circuit 110, or executes an instruction of a manipulation system with respect to manipulation of the manipulator 132. Although only one CPU 128 is illustrated in FIG. 1, the instruction of the signal system and the instruction of the manipulation system may be separately executed by separate CPUs 128.

The manipulator 132 includes an element for manipulating the digital photographing apparatus 100 or setting various types of information for photographing the subject. The element of the manipulator 132 includes a power button, an OK button, and a cross key for selecting a photographing mode or a photographing drive mode and setting a soft focus effect, etc. The shutter button 133 is used to photograph the subject. AF is performed on the subject when the shutter button 133 is half-pressed and the subject is photographed when the shutter button 133 is fully pressed.

The memory 134 is an example of an image storage unit and temporarily stores the captured image or a composite image created by an image composer. The capacity of the memory 134 is sufficient to store a plurality of images. The memory 134 is controlled by the image input controller 114 to read and write images.

The VRAM 136 is used to maintain images or information displayed on the LCD device 124. The resolution or the maximum number of colors of the LCD device 124 depends on the capacity of the VRAM 136.

The recording medium 140 is an example of an image recorder and records the captured image. The recording medium 140 is controlled by the media controller 138 to input and output the recorded image. The recording medium 140 may be a memory card for recording data on flash memory.

The motor drivers 142a, 142b, and 142c respectively control the drivers 102a, 104a, and 106a for respectively driving the zoom lens 102, the iris 104 and the focus lens 106. The zoom lens 102, the iris 104 and the focus lens 106 are driven by the motor drivers 142a, 142b, and 142c to adjust the size of the subject on the screen, the intensity of light, and focusing, respectively.

The flash lamp 144 illuminates the subject outdoors at night or indoors in dim environments in order to photograph the subject. In a flash photographing mode, the CPU 128 transmits an emission instruction to the flash lamp 144, the flash lamp 144 emits flash light according to the emission instruction received from the CPU 128, and the flash light emitted from the flash lamp 144 illuminates the subject. Also, according to the current embodiment, in order to calculate the amount of or a time for main emission based on the emission instruction of the CPU 128, the flash lamp 144 performs pre-emission or weak emission for performing photometry on the subject to be photographed. Here, the flash lamp 144 is a xenon (Xe) flash lamp. Despite a short emission time, the Xe flash lamp is commonly used in digital cameras because the intensity of light emitted from the Xe flash lamp is superior to a light-emitting diode (LED).

Figure 2:
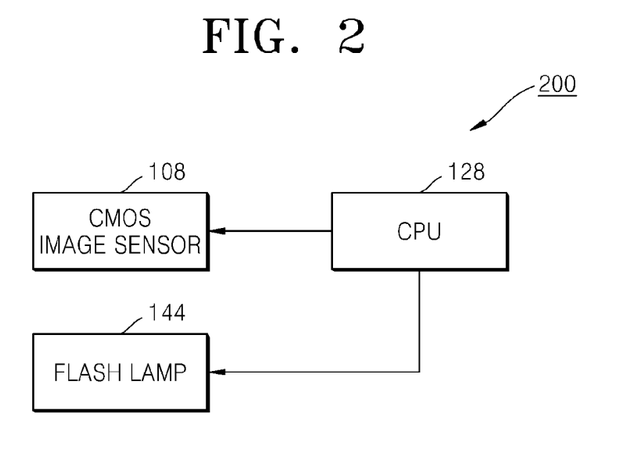
FIG. 2 is a schematic block diagram of a digital photographing apparatus including a flash emission control apparatus, according to another embodiment of the present invention.

FIG. 2 is a schematic block diagram of a digital photographing apparatus 200 for performing a flash emission control function, according to another embodiment of the present invention.

Referring to FIG. 2, the digital photographing apparatus 200 includes a CMOS image sensor 108, a CPU 128, and a flash lamp 144.

The CMOS image sensor 108 may operate using a rolling shutter or a global shutter. Here, the rolling shutter sequentially exposes pixels in one frame and thus the pixels are exposed at different times. On the other hand, the global shutter simultaneously exposes all pixels in one frame and thus the pixels have the same exposure time.

Exposure modes of the CMOS image sensor 108, i.e., a rolling shutter mode and a global shutter mode will now be described. The rolling shutter mode allows an image to be rapidly output, is generally used in a live view mode, and may also be used in an image photographing mode. Also, the rolling shutter mode may be enabled by only using an electronic shutter instead of a mechanical shutter so as to control an exposure time. On the other hand, the global shutter mode may not allow an image to be rapidly output, is generally used in an image photographing mode, may not be enabled without a mechanical shutter, and controls the exposure time by using both a mechanical shutter and an electronic shutter.

In an exposure control algorithm when the CMOS image sensor 108 operates in the rolling shutter mode, the exposure time is controlled by controlling a register for controlling the exposure time. In more detail, long exposure is performed if a time set in the register is long and short exposure is performed if the time set in the register is short. On the other hand, in an exposure control algorithm when the CMOS image sensor 108 operates in the global shutter mode, the exposure time is calculated by adding a time for shutting a mechanical shutter to the time set in the register.

The flash lamp 144 performs pre-emission and main emission in order to control the exposure of a subject to be photographed. Here, the pre-emission is performed at a weak level to measure the brightness of the subject and the main emission is performed to make the subject reach a preset brightness level by using the brightness of the subject, which is measured by performing the pre-emission. During the main emission, an emission time of flash light is calculated and flash light is emitted for the calculated emission time. Although only the flash lamp 144 is illustrated in FIG. 2, a charger, a booster, a charge detector, etc. may further be included in a configuration for making the flash lamp 144 emit flash light.

The CPU 128 controls the flash lamp 144 to perform the pre-emission based on a pre-emission method and synchronizes the exposure time of the CMOS image sensor 108 to a pre-emission time. Then, photometry is performed according to the exposure of the CMOS image sensor 108 and a main emission time of the flash lamp 144 is calculated according to a result of the photometry, thereby controlling the flash lamp 144 to perform the main emission.

The configuration of the flash emission control apparatus or the CPU 128 illustrated in FIG. 2 will now be described in detail with reference to FIG. 3.

Figure 3:
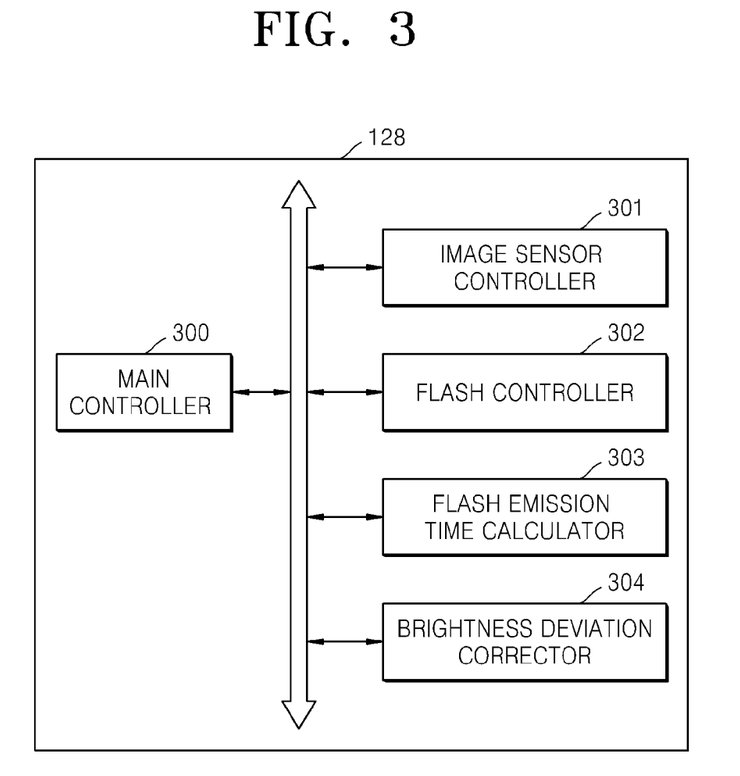
FIG. 3 is a schematic block diagram of the flash emission control apparatus illustrated in FIG. 2, according to an embodiment of the present invention.

FIG. 3 is a schematic block diagram of the flash emission control apparatus (CPU 128) illustrated in FIG. 2, according to an embodiment of the present invention. FIG. 3 will be described in conjunction with FIG. 2.

Referring to FIG. 3, the CPU 128 includes a main controller 300, an image sensor controller 301, a flash controller 302, a flash emission time calculator 303, and a brightness deviation corrector 304. Here, the CPU 128 and a flash emission control apparatus recited in the appended claims should be construed as the same element.

The CPU 128 controls overall operation of the digital photographing apparatus 100 illustrated in FIG. 1. Also, the CPU 128 controls the flash lamp 144 to emit flash light.

The main controller 300 controls overall operations of the digital photographing apparatus 100 and the elements included in the CPU 128. Also, for example, if a flash photographing mode based on a pre-emission method is selected by a user, the main controller 300 controls the flash controller 302 to make the flash lamp 144 perform pre-emission. In this case, the image sensor controller 301 synchronizes an exposure time of an image sensor to a pre-emission time or a pre-emission cycle. Thus, although flash light is emitted for a short time, partial image exposure as in a rolling shutter effect may be prevented.

When the CMOS image sensor 108 is exposed, the main controller 300 controls the CMOS image sensor 108 to perform photometry. The flash emission time calculator 303 calculates a main emission time of the flash lamp 144 based on a result of the photometry. In general, an emission time of flash light is calculated by calculating a desired brightness of a subject based on a result of the photometry of the subject and a current ambient illuminance and estimating the intensity of flash light to be added to the current ambient illuminance. Various other methods for calculating an emission time of flash light based on a pre-emission method may also be used.

The flash controller 302 controls the flash lamp 144 to emit flash light for the emission time calculated by the flash emission time calculator 303.

The brightness deviation corrector 304 corrects a brightness deviation of a photometric image by using an inverse function of an emission curve of flash light. The brightness deviation corrector 304 performs the photometry by controlling the flash lamp 144 to perform the pre-emission. Since flash characteristics, which may be represented by an emission intensity of flash light versus emission time curve, are not uniform, a main emission time may be accurately calculated by correcting the brightness deviation of the photometric image.

Figure 4:
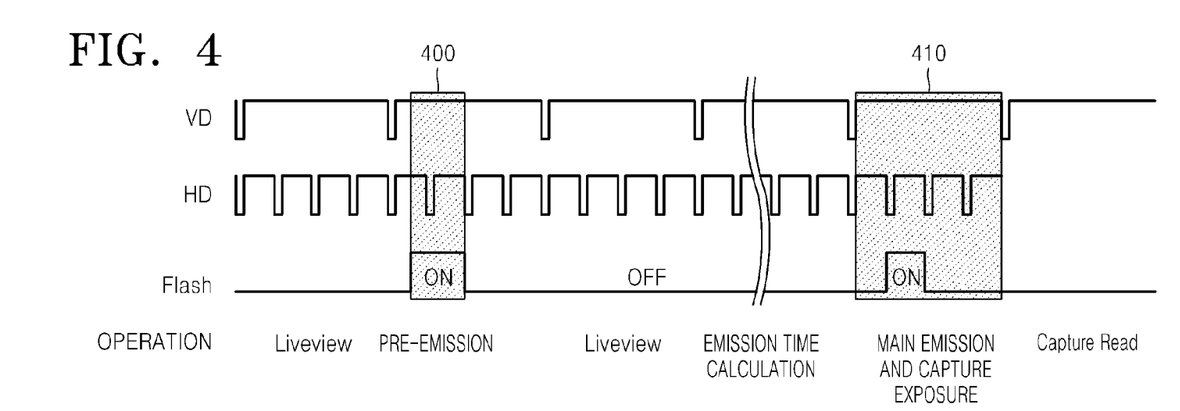
FIG. 4 is a timing diagram for describing a conventional flash emission function.

FIG. 4 is a timing diagram for describing a conventional flash emission function.

Referring to FIG. 4, a vertical drive (VD) cycle, a horizontal drive (HD) cycle, an on/off state of flash light, and operation states of a digital photographing apparatus are illustrated. Here, a VD signal is a vertical synchronization signal and represents a cycle in which one frame of an image is exposed. When the digital photographing apparatus operates in a live-view mode, flash light may be emitted for less than one VD cycle in a pre-emission period 400 and thus only a portion of a frame of a live-view image, instead of the whole frame, is exposed due to the rolling shutter effect described above in the description of the related art. Since the live-view image is exposed by an image sensor that operates in a rolling shutter mode, all pixels are not simultaneously exposed but are sequentially exposed during pre-emission. In particular, partial image exposure seriously occurs when using a Xe flash lamp having a short emission time.

However, in a main emission period 410, when an image is captured, since the digital photographing apparatus operates in a global shutter mode, which does not cause the rolling shutter effect, although flash light is emitted for a time less than one VD cycle, an emission effect occurs on the whole frame.

Thus, as a flash emission control apparatus according to an embodiment of the present invention, the CPU 128 prevents partial image exposure caused by a short pre-emission cycle by controlling the flash lamp 144 to perform the pre-emission based on a pre-emission method and synchronizing the exposure time of the CMOS image sensor 108 to a pre-emission time, which will now be described in detail with reference to FIGS. 5 and 6.

Figure 5:
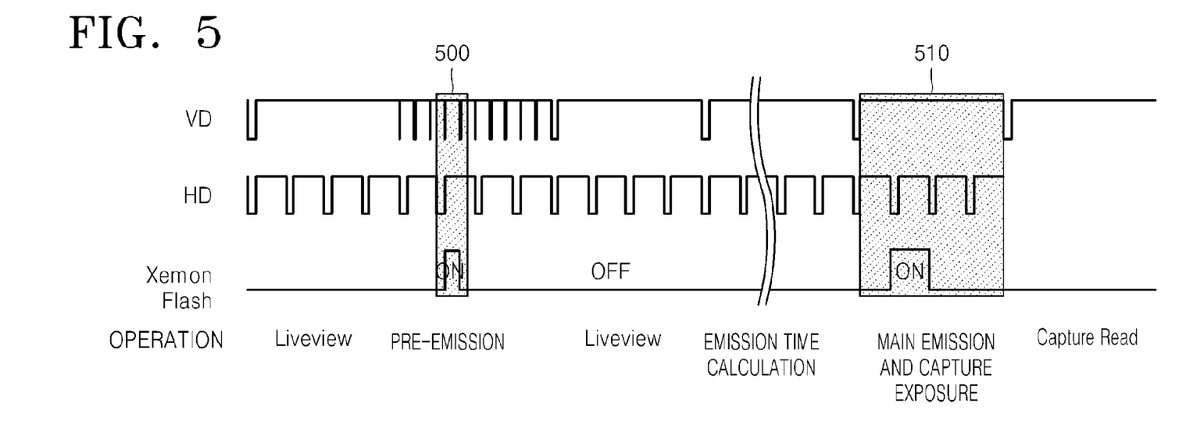
FIGS. 5 and 6 are timing diagrams for describing functions of a flash emission control apparatus, according to embodiments of the present invention.
Figure 6:
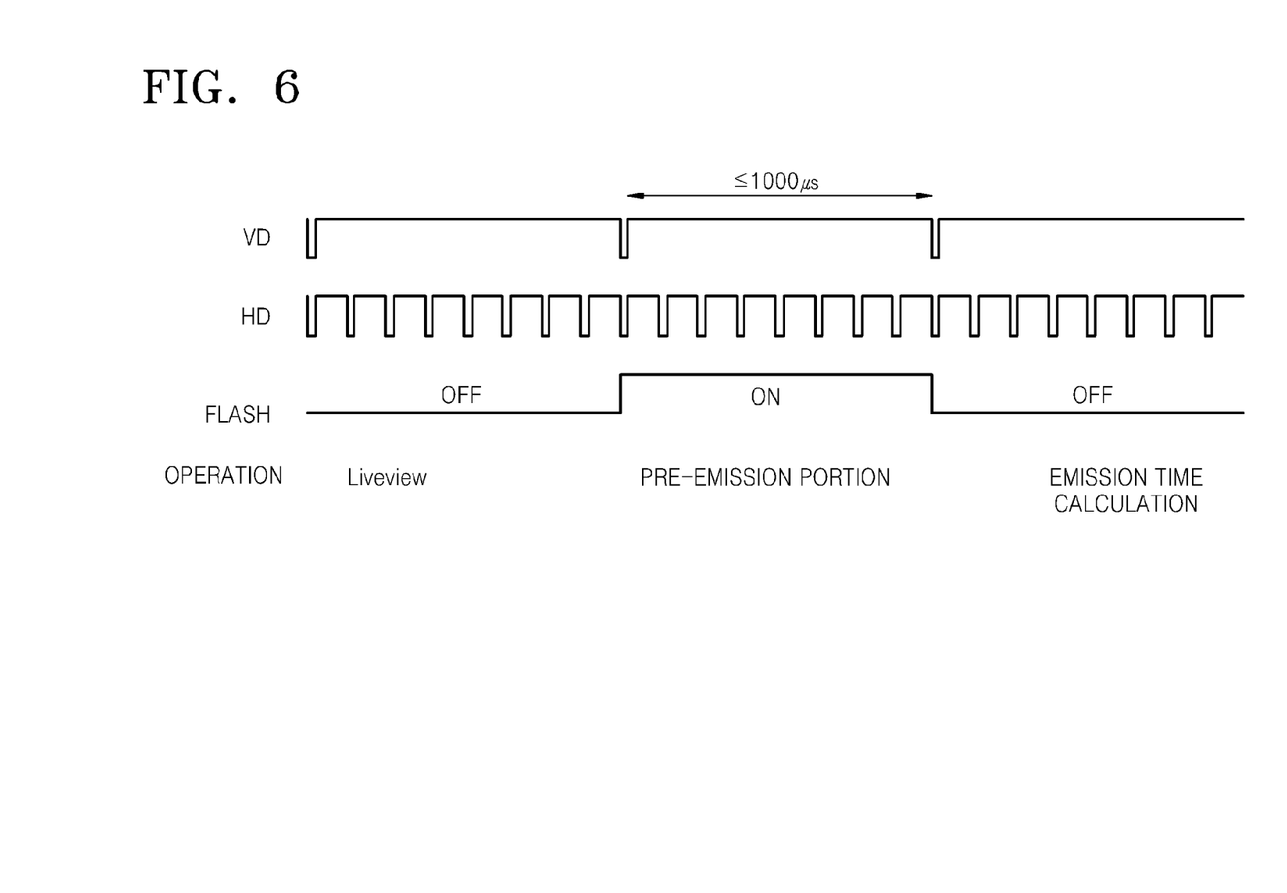

FIGS. 5 and 6 are timing diagrams for describing functions of a flash emission control apparatus, according to an embodiment of the present invention.

Referring to FIG. 5, a VD signal cycle, i.e., one frame cycle is synchronized to a pre-emission time or a pre-emission cycle. Thus, partial exposure of a photometric image may be prevented. Also, an image sensor, more particularly, a CMOS image sensor may output the image at a high frame speed greater than 1000 fps. A generally-used CMOS image sensor has a frame speed of 1200 fps and future CMOS image sensors will have higher frame speeds. Thus, as illustrated in FIG. 5, the frame speed during pre-emission is increased and thus partial image exposure due to a rolling shutter is prevented.

Referring to FIG. 6, flash light, e.g., Xe flash light may be continuously emitted for a short time. In this case, based on an emission time of the Xe flash light, an exposure time is synchronized to a time less than a VD cycle. Thus, when a frame speed is 1000 fps, if an emission time of flash light is synchronized to the VD cycle, the emission time of the Xe flash light is 1000 μs. However, if the emission time is set to be less than the VD cycle, even if the pre-emission of the Xe flash light is performed for a time less than the VD cycle, partial exposure of a frame may be prevented.

Also, optionally, when the exposure time is short, if a photometric image is dark, the brightness of the photometric image may be compensated by correcting an International Organization for Standardization (ISO) gain or a digital gain.

FIGS. 7A through 7D are graphs for describing brightness deviation correction, according to embodiments of the present invention.

Figure 7A:
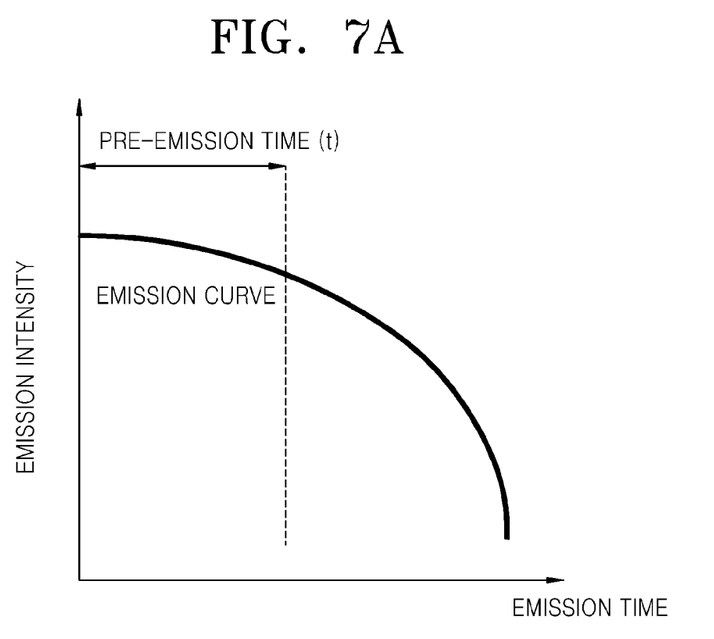
FIGS. 7A through 7D are graphs for describing brightness deviation correction, according to embodiments of the present invention.
Figure 7B:
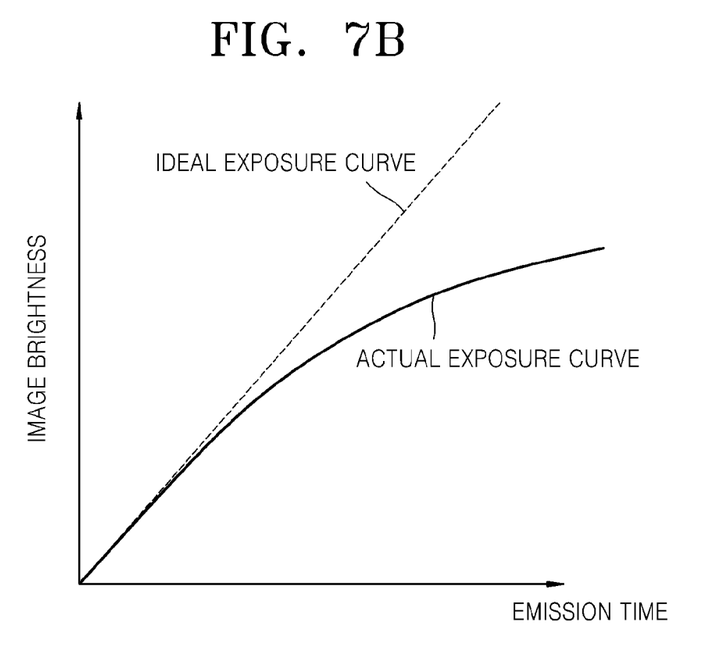

In general, an emission intensity versus emission time curve of flash light, particularly, Xe flash light with respect to exposure time is not uniform and has a shape as illustrated in FIG. 7A. If uneven flash emission is applied to an image exposed by using a rolling shutter, brightness differences partially occur on a resultant image. FIG. 7B illustrates an ideal exposure curve and an actual exposure curve of image brightness versus emission time. In particular, unlike a case when flash emission is not evenly performed on a whole image, a brightness deviation of the image based on flash characteristics represents a case when brightness differences occur although flash emission is evenly performed on a whole image. Thus, an evenly exposed image without partial brightness differences is required to calculate an appropriate main emission intensity.

Figure 7C:
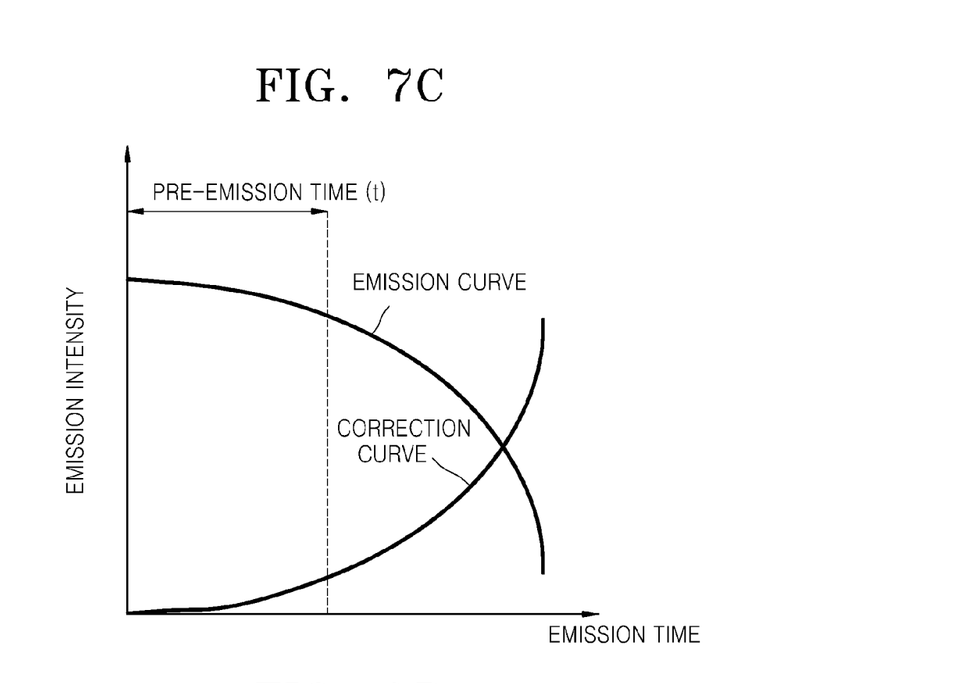

FIG. 7C illustrates an emission intensity versus emission time curve and a correction curve that is an inverse function of the emission curve. Here, it is assumed that the emission curve is known and the brightness deviation of the image may be corrected by using the inverse function of the emission curve, i.e., the correction curve.

Figure 7D:
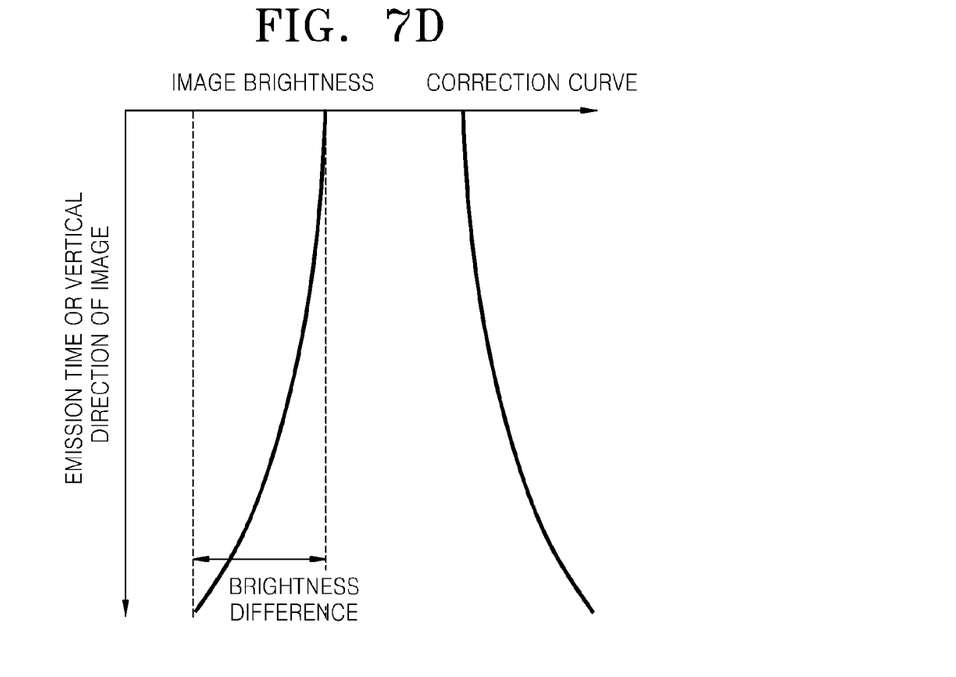

As illustrated in FIG. 7D, the emission curve has a low brightness as an emission time or a vertical direction of the image increases. Thus, the inverse function of the emission curve, i.e., the correction curve may correct the brightness deviation of the image by correcting the brightness of the image to be high as the emission time or the vertical direction of the image increases.

Figure 8:
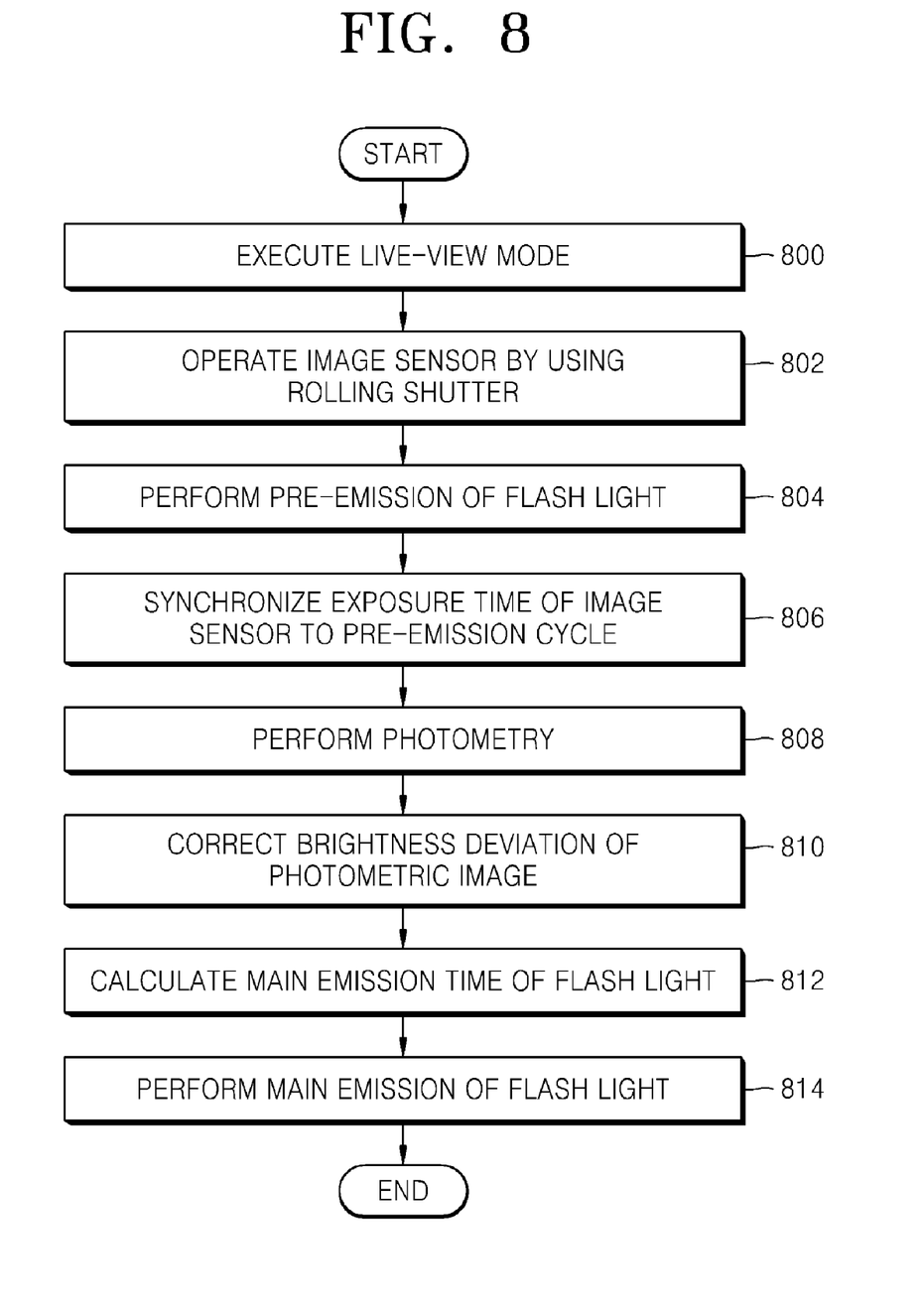
FIG. 8 is a flowchart of a flash emission control method, according to an embodiment of the present invention.

FIG. 8 is a flowchart of a flash emission control method, according to an embodiment of the present invention.

Referring to FIG. 8, in operation 800, a live-view mode is executed, and in operation 802, an image sensor operates in a rolling shutter mode and thus is exposed. In operation 804, pre-emission of flash light is performed.

In operation 806, an exposure time of the image sensor is synchronized to a pre-emission time or a pre-emission cycle.

Here, the exposure time is controlled by controlling a register for controlling the exposure time. In more detail, the exposure time is reduced by reducing a time set in the register. The exposure time may be less than an emission time.

In operation 808, photometry is performed in response to the pre-emission, and in operation 810, a brightness deviation of a photometric image is corrected. In operation 812, a main emission time of flash light is calculated based on the corrected brightness of the photometric image. In a main emission time control algorithm based on the pre-emission, the main emission time is calculated by using a conventional flash emission time control algorithm. Then, in operation 814, main emission of flash light is performed for the calculated main emission time so as to capture an image.

One of ordinary skill in the art would understand that a camera phone provided with a camera function, a personal digital assistant (PDA), and a portable multimedia player (PMP) may be used as the digital photographing apparatus.

As described above, according to the present invention, when pre-emission of flash light is performed, partial exposure during the pre-emission in operating an image sensor using a rolling shutter may be prevented by synchronizing an exposure time of the image sensor to a pre-emission time.

Also, when the pre-emission is performed in operating the image sensor using a rolling shutter, the brightness of an image may be accurately measured by correcting a brightness deviation of the image, which is caused by flash characteristics.

In general, an apparatus for performing the methods according to the embodiments of the present invention may be implemented using any general purpose computing device or devices. Any of the computing devices may comprise a processor, a memory for storing program data and executing the program data, a permanent storage such as a disk drive, a communications port for handling communications with external devices, and user interface devices, including a display, keyboard, mouse, etc. When software modules are involved, these software modules may be stored as program instructions executable on the processor on a computer-readable storage medium, where the program instructions stored on this medium can be read by the computing device, stored in the memory, and executed by the processor. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory). The storage medium may also be distributed over network-coupled computing devices so that the program instructions are stored and executed in a distributed fashion.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A flash emission control method comprising:
in a rolling shutter mode:
performing pre-emission of flash light;
controlling both an exposure time of an image sensor and a pre-emission time for the pre-emission flash of light such that the pre-emission time for the pre-emission flash overlaps the exposure time;
performing photometry according to exposure of the image sensor;
calculating a main emission time of the flash light based on a result of the photometry; and
controlling main emission of the flash light to be performed for the calculated main emission time.

2. The method of claim 1, wherein the image sensor is a complementary metal-oxide semiconductor (CMOS) image sensor.

3. The method of claim 1, wherein the flash light is xenon (Xe) flash light.

4. The method according to claim 1, wherein the pre-emission time for the pre-emission flash completely overlaps the exposure time.

5. The method of claim 2, wherein the exposure time of the CMOS image sensor is less than the pre-emission time.

6. The method of claim 2, further comprising:
executing a live-view mode; and
operating the CMOS image sensor using a rolling shutter.

7. A flash emission control method comprising:
performing pre-emission of flash light;
synchronizing an exposure time of an image sensor to a pre-emission time;
performing photometry according to exposure of the image sensor;
calculating a main emission time of the flash light based on a result of the photometry; and
controlling main emission of the flash light to be performed for the calculated main emission time;
wherein the calculating of the main emission time comprises correcting a brightness deviation of a photometric image by using an inverse function of an emission curve of the flash light.

8. The method of claim 7, wherein the calculating of the main emission time comprises calculating the main emission time of the flash light based on the corrected brightness of the photometric image.

9. The method of claim 7, wherein the calculating of the main emission time comprises correcting the brightness deviation corresponding to the inverse function of the emission curve of the flash light by applying the brightness deviation in a vertical direction of the photometric image.

10. A computer-readable storage medium having stored thereon a program executable by a processor for performing a method of flash emission control, the method comprising:
in a rolling shutter mode:
performing pre-emission of flash light;
controlling both an exposure time of an image sensor and a pre-emission time for the pre-emission flash of light such that the pre-emission time for the pre-emission flash overlaps the exposure time
performing photometry according to exposure of the image sensor;
calculating a main emission time of the flash light based on a result of the photometry; and
controlling main emission of the flash light to be performed for the calculated main emission time.

11. The storage medium according to claim 10, wherein the pre-emission time for the pre-emission flash completely overlaps the exposure time.

12. A flash emission control apparatus comprising:
an image sensor controller that controls an exposure time of an image sensor such that a pre-emission time for a pre-emission of flash light is overlapped by the exposure time when operating in a rolling shutter mode
a main controller that controls photometry to be performed according to exposure of the image sensor;
a flash emission time calculator that calculates a main emission time of the flash light based on a result of the photometry; and
a flash controller that controls main emission of the flash light to be performed for the calculated main emission time.

13. The apparatus of claim 12, wherein the image sensor is a complementary metal-oxide semiconductor (CMOS) image sensor.

14. The apparatus of claim 13, wherein the exposure time of the CMOS image sensor is less than the pre-emission time.

15. The apparatus of claim 13, wherein the image sensor controller controls the CMOS image sensor to operate using a rolling shutter.

16. The apparatus of claim 13, wherein the flash light is xenon (Xe) flash light.

17. A flash emission control apparatus comprising:
an image sensor controller that synchronizes an exposure time of an image sensor to a pre-emission time when pre-emission of flash light is performed;
a main controller that controls photometry to be performed according to exposure of the image sensor;
a flash emission time calculator that calculates a main emission time of the flash light based on a result of the photometry;
a flash controller that controls main emission of the flash light to be performed for the calculated main emission time and
a brightness deviation corrector that corrects a brightness deviation of a photometric image by using an inverse function of an emission curve of the flash light.

18. The apparatus of claim 17, wherein the flash emission time calculator calculates the main emission time of the flash light based on the corrected brightness of the photometric image.

19. The apparatus of claim 17, wherein the brightness deviation corrector corrects the brightness deviation corresponding to the inverse function of the emission curve of the flash light by applying the brightness deviation in a vertical direction of the photometric image.

20. The apparatus according to claim 17, wherein the pre-emission time for the pre-emission flash completely overlaps the exposure time.

* * * * *